ALFRED N. DUCKSBURY
BRUCE C. TELFORD
INVENTORS

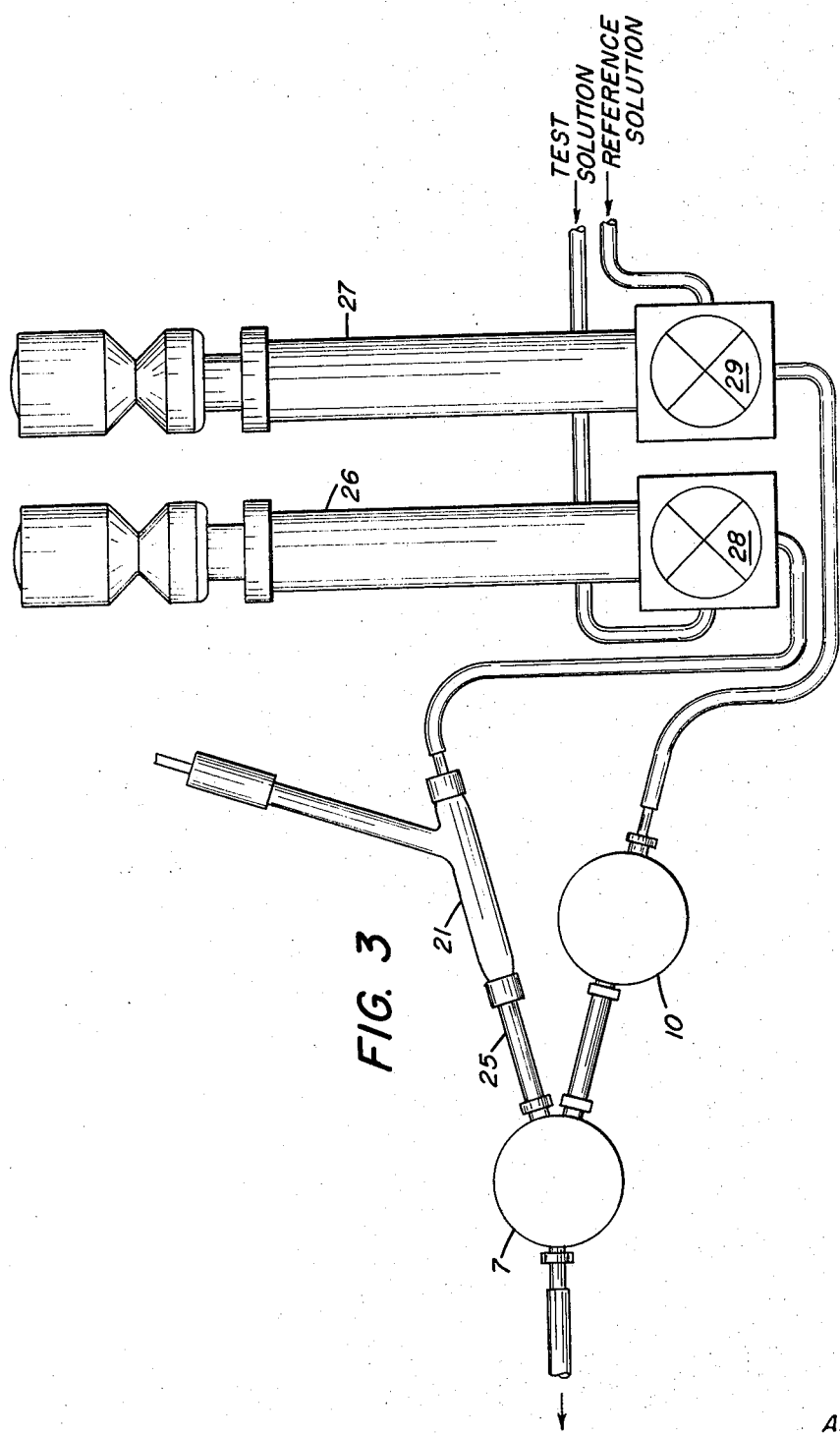
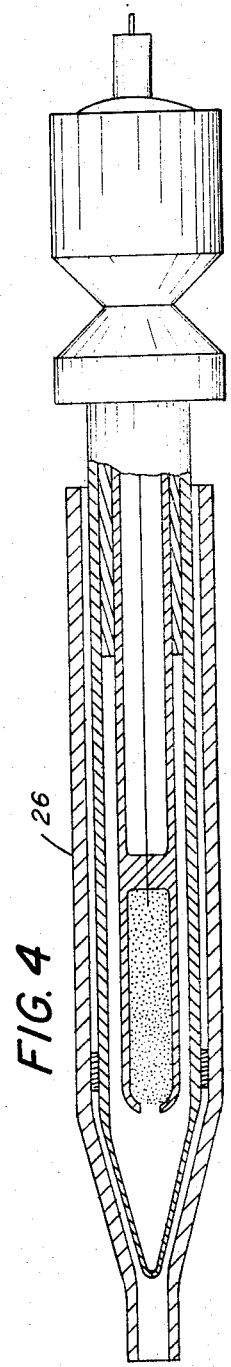
FIG. 3
FIG. 4
ALFRED N. DUCKSBURY
BRUCE C. TELFORD
INVENTORS United States Patent Office 3,681,205
Patented Aug. 1, 1972

3,681,205
METHOD AND CELL FOR REPETITIVE HIGH PRECISION pH AND LIKE MEASUREMENTS
Alfred N. Ducksbury, Cheltenham, Victoria, and Bruce C. Telford, Glenroy, Victoria, Australia, assignors to Eastman Kodak Company, Rochester, N.Y.
Filed June 29, 1970, Ser. No. 50,498
Claims priority, application Australia, July 10, 1969, 57,760/69
Int. Cl. G01n 27/36
U.S. Cl. 204—1 T
11 Claims

ABSTRACT OF THE DISCLOSURE

A reference solution of known characteristics and a test solution are passed through separate capillary tubes to the arms of a Y-shaped passage and into the stem of the Y where they flow unmixed with an interface. Electrodes in the two solutions are coupled to a standard pH meter where the pH of the test solution is displayed.

BACKGROUND OF THE INVENTION

Field of the invention

This invention relates to a cell for repetitive high-precision pH and other ion concentration measurements.

The prior art

Known methods and apparatus for measuring pH suffer from several serious sources of error. For example the reliability of measurements derived from one standard procedure, known as the A.S.T.M. E70–52T method, is generally no better than ±0.06 pH with photographic developer solutions. The disadvantages of that method include:

(1) High probability of electrode breakage or malfunction through handling by the operator;

(2) Very limited control over the temperature of solution, since these have usually been contained in open vessels;

(3) The usual calomel electrode design leads to variations in potential caused by temperature gradients along the calomel stem;

(4) The constrained diffusion liquid junction is unreliable; it is easily blocked and gives rise to large and variable liquid junction potentials; and (5) The possibility of contamination of samples from the atmosphere and by the operator.

It is known that static or flowing free-diffusion junctions have high stability and can be made to be very reproducible, but the apparatus for forming these types of junctions has hitherto been rather cumbersome and difficult to operate. Such systems are described by: Lamb and Larsen, J.A.C.S., 42, 229 (1920); N. F. McLagen, Biochia J., 309 (1929); V. Wynn and J. Ludbrook, Lancet, 272, 1068 (1957); A. L. Ferguson, K. Van Lente and R. Hitchens, J.A.C.S., 54, 1279 (1932).

SUMMARY OF THE INVENTION

It is an object of this invention to provide an improved cell for repetitive, high-precision pH measurements wherein the above disadvantages are completely or substantially completely overcome.

With this object in view, our invention in one aspect provides a cell for high-precision pH measurement in which the relevant electrodes e.g. calomel and glass electrodes, are incorporated in a single unit which need never itself be handled by the operator.

According to the present invention a cell for high-precision pH measurement or measurement of other ion concentration in a test solution includes a first intake passage adapted to receive said solution, a first half-cell assembly having an appropriate electrode in contact with the test solution, a second intake passage adapted to receive a reference electrolyte of known concentration and composition, a second half-cell assembly having an appropriate electrode in contact with the reference electrolyte, characterized by means for uniting said first and second passages downstream of their associated electrodes whereby the solutions are adapted to flow together to form at an interface therebetween a substantially stable free-diffusion liquid junction at which the solutions are in direct but non-mixing contact, such that from a potential difference between said electrodes the pH or other relevant ion concentration can be derived in known manner.

THE DRAWINGS

In order that the invention may be better understood, reference will now be made to the accompanying drawings which are to be considered as part of this specification and read herewith. In the drawings:

FIG. 3 shows how the cell of FIG. 1 or 2 may be used by introducing the test and standard electrolyte solutions through two syringes; and FIG. 4 shows how a syringe plunger may be employed as an electrode to replace either the indicater or reference electrodes or both, in association with the cell shown in FIG. 1 or 2.

THE PREFERRED EMBODIMENTS

Figure 1:
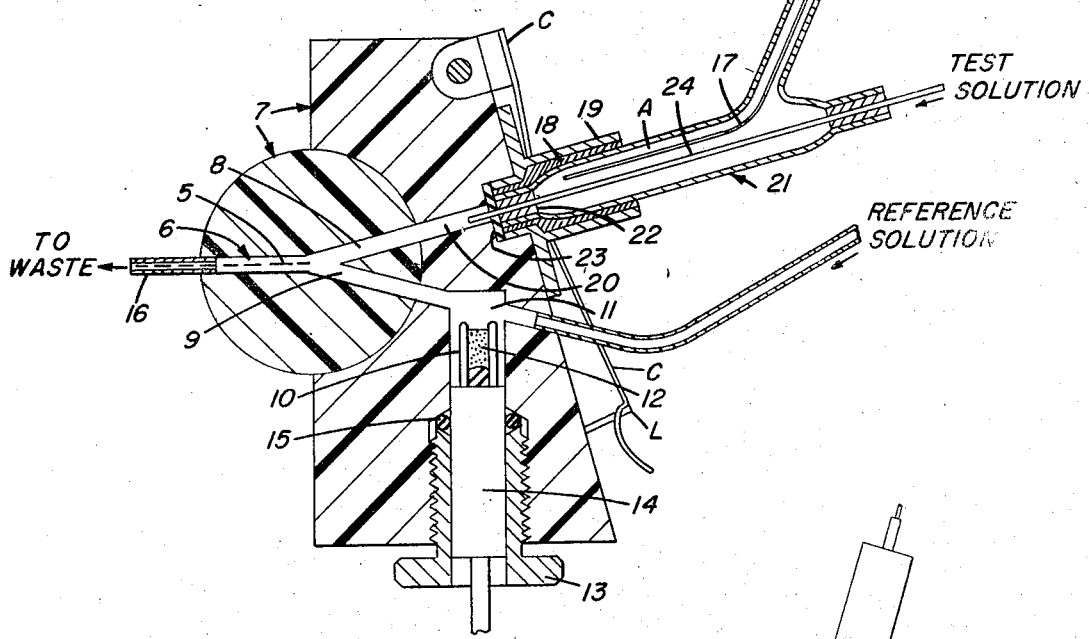
FIGS. 1 and 2 are sectionalized diagrams showing cells according to two preferred embodiments of the invention.

Referring to the drawings in more detail, the cell may be of the flow-through type having a liquid junction passage 5 formed in the stem of a Y-tube 6 drilled in a junction block 7, made from acrylic plastic or other suitable material. Passage 5 constitutes means for uniting first intake passage or arm 8 adapted to receive a test solution and second intake passage or arm 9 adapted to receive a reference electrolyte having a known concentration of the ion to which the second (reference) electrode is reversible.

The liquid passages may have identical and preferably small cross-sections. For example this cross-section may be circular of about 0.060 inch in diameter. Such a small cross-section allows the solution to be maintained under substantially complete thermal equilibrium.

The second or lower passage 9, into and through which flows the reference electrolyte e.g. potassium chloride solution, connects to a calomel half-cell 10 for which a recess 11 is drilled in the junction block 7. The calomel element 12, which as is well known develops a constant known potential in the reference electrolyte, is also preferably of small size e.g. 0.125 inch outside diameter by 0.25 inch in length. The element may be sealed in position by means of a compression nut 13 co-operating with an insulating electrode cap 14 and O-ring compression fitting 15. From the confluence 5 of passages 8 and 9 the liquids flow to waste through outlet 16.

Figure 2:
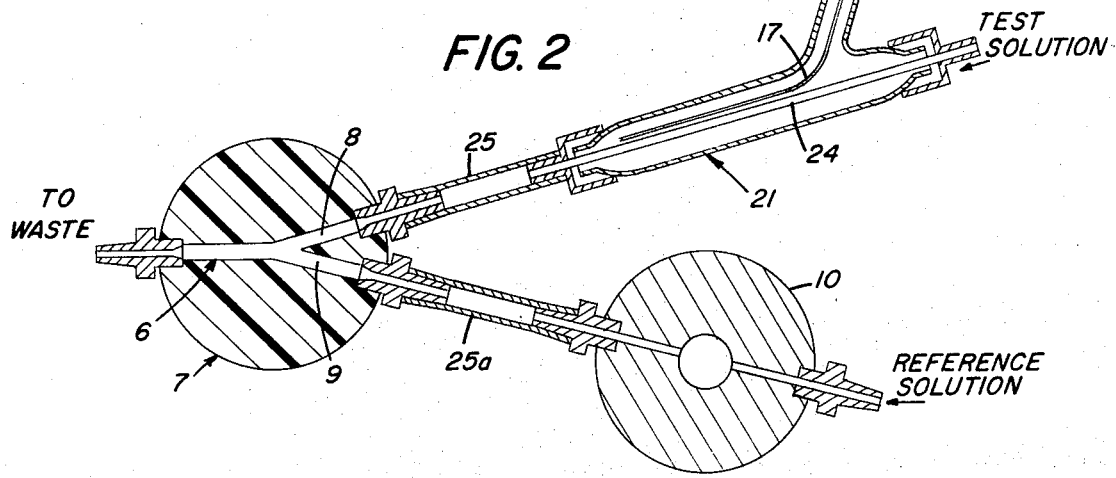

The half-cell assembly 21 may be a tubular "glass electrode" of the flow-through type incorporating a capillary glass tube membrane 24 which obviates the need for a separate containing cell. This electrode has a glass body and a silver-silver chloride internal electrode 17 immersed in a buffer solution of constant pH in annulus A. The glass of said capillary membrane is of a type which is sensitive to hydrogen ions, and is readily available from Corning Glass Works. The assembly 21 may be mounted using an epoxy cement filler 18 in a metal collar 19 coaxial with that portion 20 of passage 8 that is defined by block 7, and the assembly clamped into a recess in the junction block such as by means of a pivoted spring clip C captured by a latch L. Silicone rubber 22 including a small silicone rubber washer 23 may act as a gasket between a central flow-through glass membrane 24 and the junction assembly. This flow-through electrode 21 and the calomel electrode 10 may also be separated from the junction assembly but may be connectable thereto by means of flexible tubing 25 and 25a as shown in FIG. 2.

In use under "dynamic" conditions, the sample solution and reference electrolyte are received into their respective passages 8 and 9 so as to meet preferably at equal flow speeds to form a flowing liquid junction at the confluence of the Y. A dual channel peristaltic pump may be used to feed the solutions to the cell. This eliminates any difficulty of having carefully to balance the hydrostatic heads of the two streams of liquid, and a sharp boundary is maintained between the reference and test sides of the cell.

Since the peristaltic pump causes the liquid junction to pulsate a little, it is preferred that the measurement be made statically i.e. with the pump stopped, when the cell becomes one with an extended static free-diffusion liquid junction. However by using a long-bore syringe or other means one can obtain a flow that is reasonably free from pulsation, and one could then apply the invention equally well to a dynamic liquid junction.

The electrodes 10 and 21 are connected to a standard pH meter for display of the pH value of the test solution based on potential difference. Such meters are readily available from Corning Glass Works, Beckman Instruments, Orion Research Inc., Leeds & Northrup, Foxboro Instruments and others, for example the digital pH/mv. meter model 701 or 801 of Orion Research Inc.

FIG. 3 shows another preferred embodiment employing two plunger actuated syringes 26, 27 that can be used independently to allow flushing of either first or second half-cell as required, or coupled for use in conjunction when passing the sample solution and reference electrolyte simultaneously through the respective electrodes.

Valves 28 and 29 permit the syringes to be filled, after which they are closed while the plungers are actuated to drive the solutions through the cell.

A preferred embodiment, as shown in FIG. 4, employs a conventional bulb glass electrode such as a Leeds and Northrup Black Dot electrode No. 117,169, which may be used as a plunger of syringe 26 used to pump the test solution instead of a flowthrough electrode 21 as shown in FIGS. 1, 2 and 3.

It will be understood that the electrode associated with the reference electrolyte may also be incorporated as the plunger of syringe 27 used to pump the standard solution (in the same manner as shown in FIG. 4), instead of electrode 10, so that either electrode may act in this manner, or both, or neither, depending upon the circumstances involved.

Measurements made by any of these embodiments of the invention are generally found to be reproducible to within ±0.003 pH unit, with excellent stability of the liquid junction (fluctuations caused by liquid junction potentials are usually within ±0.002 pH).

EXAMPLE I

Using the technique and apparatus illustrated in FIG. 1, and introducing the sample and reference electrolytes to the electrodes and junction with a peristaltic pump at a temperature of 80° F., the following repetitive measurements of pH were made on a buffer solution 0.01 M with respect to sodium tetraborate ($Na_2B_4O_7 \cdot 10H_2O$): 9.165; 9.169; 9.166; 9.165; 9.164; 9.165; 9.166; 9.165; 9.165; 9.166; 9.165. The nominal pH of this solution is 9.165 at 80° F.

EXAMPLE II

Using the technique and apparatus illustrated in FIG. 3, introducing the sample and reference electrolytes by means of two syringes at a temperature of 80° F. the following measurements were made.

Set meter at pH 9.165 using sodium tetraborate (0.01 M) buffer. Measure buffer 12 (calcium chloride-calcium hydroxide buffer nominal pH value at 80° F. 11.79±0.03): 11.794; 11.790; 11.779; 11.787.

Measure photographic developing solution: 10.808; 10.801; 10.798; 10.784.

Set buffer 4 (potassium acid phthalate 0.05 M nominal pH value 4.010 at 80° F.): 4.010.

Measure photographic fixing solution: 5.004; 5.011; 5.005; 5.007.

Measure buffer 4: 4.001.

EXAMPLE III

Using bulb glass electrode as plunger in syringe according to FIG. 4.

Measurements made on potassium acid phthalate 0.05 M, nominal pH value 4.010 at 80° F.: 4.010; 4.011; 4.006; 4.016; 4.012; 4.008; 4.013; 4.012; 4.013; 4.006.

The cell provided by our invention has been found considerably to improve the precision and reliability of pH measurements by:

(1) Enabling temperature control of the electrodes and solutions to be generally within ±0.01° C. by totally enclosing the cell in a temperature controlled environment;

(2) Utilizing a liquid junction of the flowing or static free-diffusion type;

(3) Making it possble to introduce samples into the cell anaerobically;

(4) Enabling both electrodes to remain untouched by the operator;

(5) Rendering the cell self-flushing; and (6) Making feasible a low thermal mass for the cell so that temperature control is maintained through the action of the thermostated environment rather than by the thermal inertia of the cell components.

Furthermore our cell can be incorporated in most measuring systems and connected to most conventional pH meters or recorders. It is particularly suited to on-line applications. It enables high precision pH measurements to be made with great rapidity (usually less than one minute per measurement) and less involvement on the part of the operator than with conventional procedures. The range of pH that can be measured is limited only by the availability of suitable glass and other electrodes.

While the use of capillary type flow-through electrodes may be found to be most convenient, it is not essential. The basis of the invention resides in the formation of the liquid junction, and in the dynamic case, in providing a satisfactory flow of solution past the electrode surfaces. The actual shape of the electrodes is immaterial.

Although we have referred to the use of a peristaltic pump, any device that will positively force the two solutions (i.e. the test and reference electrolyte solutions) at the same rate past the relevant electrodes can be used when the cell is used dynamically.

Also we have described potassium chloride as a reference electrolyte in a preferred form of the invention, but it will be appreciated that the reference electrolyte is by no means limited thereto. For example it could be potassium nitrate or potassium sulphate. Furthermore it is not necessary to restrict the apparatus to pH measurement using a glass electrode and a saturated calomel electrode. Specific ion measurements using any indicator and reference electrode system may be determined with equal facility. Examples of such systems are:

Silver ion indicator electrode and mercury-mercury sulphate reference electrode;

Calcium ion indicator electrode and calomel reference electrode; and

Glass indicator electrode and silver-silver chloride reference electrode.

The extremely high stability and reproducibility of measurements obtained using our cell is considered to be due to the stability of the liquid junction between the reference electrolyte and the standard solution in passage 5. This junction is made in the single stem of the Y tube and is in the form of the two solutions in direct contact with each other but not mixed. The electrical contact is formed by diffusion of the ions across the boundary of the two solutions.

As distinct from conventionally used constricted diffusion junctions, this contact generates a uniform and constantly reproducible potential which enables measurements of pH to be made with the degree of reproducibility required.

Utilizing this technique it is possible to make measurements of pH even at pH's in excess of 10, with a reproducibility within ±0.005 pH or better; this enables more accurate control of processes such as photographic developing, both black-and-white and color.

Specific ion and blood pH may also be measured by this technique.

The invention has been described in detail with particular reference to the preferred embodiments thereof, but it will be understood that variations and modifications can be effected within the spirit and scope of the invention.

We claim:

1. In a cell for high-precision pH measurement or measurement of other ion concentration in a test solution, including a first intake passage adapted to receive said test solution, a first half-cell assembly comprising a glass electrode adapted to be in contact with the test solution, a second intake passage adapted to receive a reference electrolyte of known concentration and composition, a second half-cell assembly having an appropriate electrode adapted to be in contact with the reference electrolyte, and a third passage for uniting said first and second passages downstream of their associated electrodes: the improvement wherein said third passage forms the stem of a Y, and said first and second passages form the arms of such a Y, whereby the soultions flow together through said third passage to form at an interface therebetween a substantially stable free-diffusion liquid junction at which the solutions are in direct but non-mixing contact, such that from a potential difference between said electrodes the pH or other relevant ion concentration can be derived.

2. A cell as claimed in claim 1 characterized in that the passages are all identical in cross section.

3. A cell as claimed in claim 2 wherein said first, second and third passages comprise bores in a junction block, said first and second passages merging smoothly together and into said third passage.

4. A cell as claimed in claim 1 characterized in that said glass electrode is of the flow-through capillary type including a tube of pH sensitive glass through which the test solution flows.

5. A cell in accordance with claim 1, in combination with means for passing a steady flow of said solutions through said passages whereby instantaneous ion concentration measurements can be made.

6. A cell as claimed in claim 5 wherein said means is pump means.

7. A cell as claimed in claim 5 wherein said means is a pair of syringes.

8. A cell as claimed in claim 7 characterized in that at least one of the electrodes is the plunger of one of said syringes.

9. A cell as claimed in claim 8 characterized in that the said plunger electrode is the electrode of the said first half-cell assembly.

10. The cell as claimed in claim 8 characterized in that the said plunger electrode is the electrode of the said second half-cell assembly.

11. A method for determining pH of a test solution comprising passing test solution into one arm of a Y-shaped passage and thence into the stem of said passage;

passing a reference solution into the other arm of said Y-shaped passage and thence into said stem;

flowing said solutions through said stem with a stable interface contact but without substantial intermixing;

maintaining a glass electrode and a reference electrode in said test solution and in said reference solution respectively upstream of the confluence of said Y-shaped passage; and measuring the potential difference between said electrodes as a function of pH of said test solution.

References Cited

UNITED STATES PATENTS

| | | | |
|---|---|---|---|
| 2,825,685 | 3/1958 | Schachter et al. | 204—275 |
| 2,985,511 | 5/1961 | Digby | 204—195 |
| 3,049,118 | 8/1962 | Arthur et al. | 204—195 |
| 3,189,533 | 6/1965 | Anscherlik | 204—195 |
| 3,216,915 | 11/1965 | Arthur et al. | 204—195 |
| 3,367,849 | 2/1968 | Blaedel et al. | 204—1 T |
| 3,424,664 | 1/1969 | Severinghaus | 204—195 |
| 3,464,908 | 9/1969 | Donaldson | 204—195 |

TA-HSUNG TUNG, Primary Examiner

U.S. Cl. X.R.

204—195 G